United States Patent [19]

Dayner et al.

[11] Patent Number: 5,212,726

[45] Date of Patent: May 18, 1993

[54] METHOD OF COMBINING SIGNALS IN A TELEPHONE CONFERENCE CIRCUIT

[75] Inventors: David Dayner, Novato; Ginny Lacker, Petaluma; Paul Hirsohn, Berkeley; Karen Bell, Rohnert Park; Darryl Paffenroth, Tiburon; Allen Jackson, Penngrove; David Hochman, Nicasio, all of Calif.

[73] Assignee: Harris Corporation, Melbourne, Fla.

[21] Appl. No.: 687,109

[22] Filed: Apr. 18, 1991

[51] Int. Cl.⁵ .................. H04M 3/42; H04M 1/00; H04Q 11/04

[52] U.S. Cl. .................................. 379/202; 379/158; 370/62

[58] Field of Search ............... 379/158, 202–206; 370/62

[56] References Cited

U.S. PATENT DOCUMENTS 4,975,902 12/1990 Damany ................. 379/202 X
4,998,243 3/1991 Kao ......................... 379/202 X

FOREIGN PATENT DOCUMENTS 0089889 4/1989 Japan ........................... 379/202

Primary Examiner—James L. Dwyer
Assistant Examiner—Harry S. Hong
Attorney, Agent, or Firm—Rogers & Killeen

[57] ABSTRACT

A method for combining signals for a telephone conference may include a multiplicity of identical adders for combining six signals and providing a single combined output. The adders may be arranged in a repeatable hierarchical scheme in which each group of six conference members includes an adder for combining all six signals, with the output of this adder being provided to other groups of six so that each conference member receives signals from every other conference member. As few as three hierarchical levels of addition may be used with up to 216 members. Adders may also be arranged so that a member of a first conference may monitor other conferences without affecting the first conference.

9 Claims, 4 Drawing Sheets

|    | N 1 | OUTPUT |
|----|-----|--------|
|    | 2   |        |
|    | 3   |        |
|    | 4   | INPUTS |
|    | —   |        |
|    | —   |        |
|    | —   |        |

| A 1 | N 1 | N 2 | N 3 | N 4 | N 5 | N 6 | OUTPUTS |
|-----|-----|-----|-----|-----|-----|-----|---------|
| 1   | 2   | 1   | 1   | 1   | 1   | 1   |         |
| 2   | 3   | 3   | 2   | 2   | 2   | 2   |         |
| 3   | 4   | 4   | 4   | 3   | 3   | 3   | INPUTS  |
| 4   | 5   | 5   | 5   | 5   | 4   | 4   |         |
| 5   | 6   | 6   | 6   | 6   | 6   | 5   |         |
| 6   | —   | —   | —   | —   | —   | —   |         |

| N'6 |
|-----|
| N 6 |
| B 1 |

70

| A 1 | N 1 | N 2 | N 3 | N 4 | N 5 | N 6 | OUTPUTS |
|-----|-----|-----|-----|-----|-----|-----|---------|
| 1   | 2   | 1   | 1   | 1   | 1   | 1   |         |
| N1  | 3   | 3   | 2   | 2   | 2   | 2   |         |
| —   | 4   | 4   | 4   | 3   | 3   | 3   | INPUTS  |
| —   | 5   | 5   | 5   | 5   | 4   | 4   |         |
| —   | 6   | 6   | 6   | 6   | 6   | 5   |         |
| —   | —   | —   | —   | —   | B1  | —   |         |

| A1 | N1 | N2 | N3 | N4 | N5 | N6 | OUTPUTS |
|----|----|----|----|----|----|----|---------|
| 1 | 2 | 1 | 1 | 1 | 1 | 1 | |
| 2 | 3 | 3 | 2 | 2 | 2 | 2 | |
| 3 | 4 | 4 | 4 | 3 | 3 | 3 | INPUTS |
| 4 | 5 | 5 | 5 | 5 | 4 | 4 | |
| 5 | 6 | 6 | 6 | 6 | 6 | 5 | |
| 6 | NA1 | NA1 | NA1 | NA1 | NA1 | NA1 | |

GROUP A1

| A2 | N7 | N8 | N9 | N10 | N11 | N12 | OUTPUTS |
|----|----|----|----|-----|-----|-----|---------|
| 7 | 8 | 7 | 7 | 7 | 7 | 7 | |
| 8 | 9 | 9 | 8 | 8 | 8 | 8 | |
| 9 | 10 | 10 | 10 | 9 | 9 | 9 | INPUTS |
| 10 | 11 | 11 | 11 | 11 | 10 | 10 | |
| 11 | 12 | 12 | 12 | 12 | 12 | 11 | |
| 12 | NA2 | NA2 | NA2 | NA2 | NA2 | NA2 | |

GROUP A2

| A3 | N13 | N14 | N15 | N16 | OUTPUTS |
|----|-----|-----|-----|-----|---------|
| 13 | 14 | 13 | 13 | 13 | |
| 14 | 15 | 15 | 14 | 14 | |
| 15 | 16 | 16 | 16 | 15 | INPUTS |
| 16 | — | — | — | — | |
| — | — | — | — | — | |
| — | NA3 | NA3 | NA3 | NA3 | |

GROUP A3

| B1 | NA1 | NA2 | NA3 | OUTPUTS |
|----|-----|-----|-----|---------|
| A1 | A2 | A1 | A1 | |
| A2 | A3 | A3 | A2 | |
| A3 | — | — | — | INPUTS |
| — | — | — | — | |
| — | — | — | — | |
| — | — | — | — | |

GROUP B1

FIG. 3

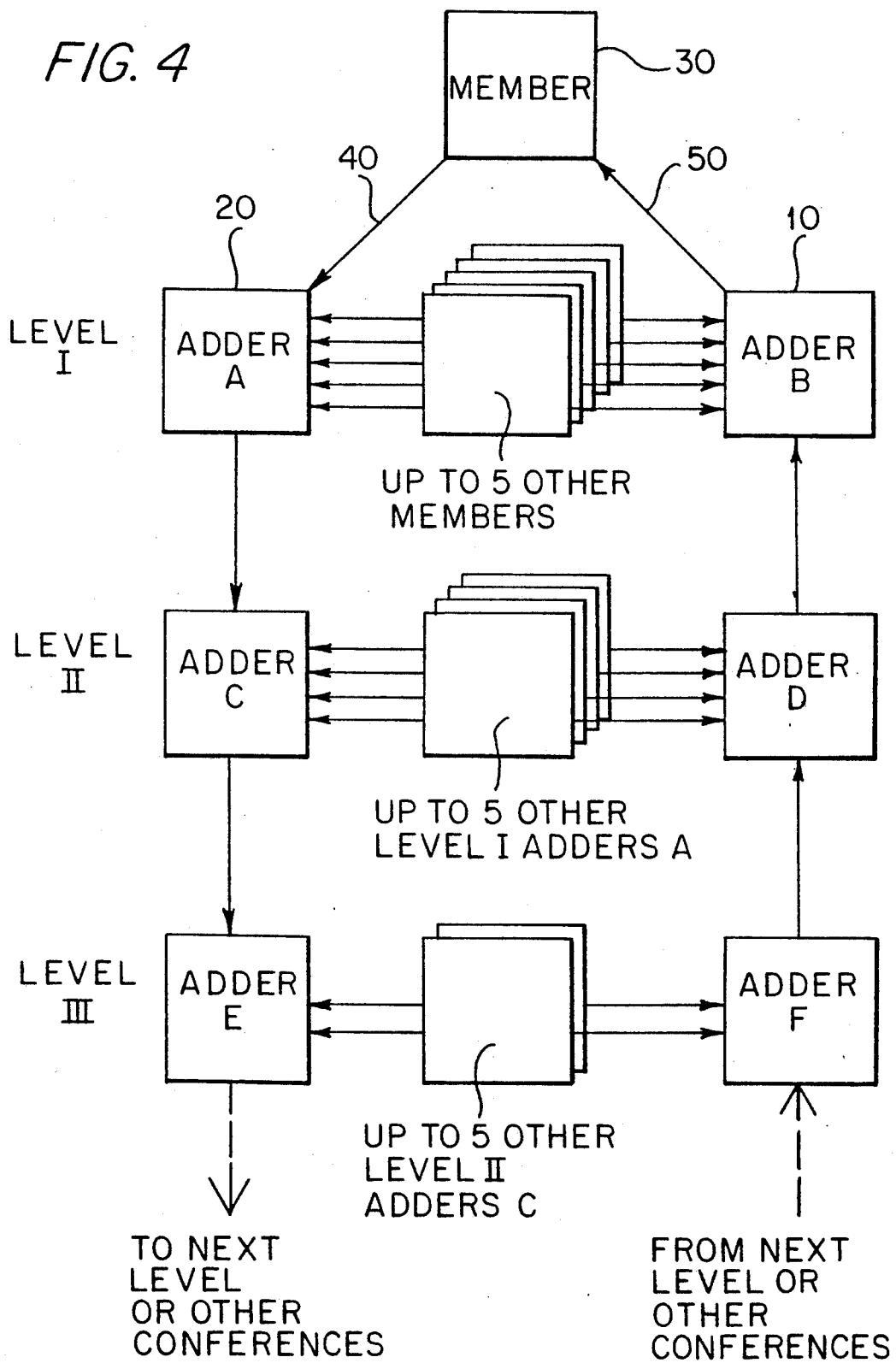

METHOD OF COMBINING SIGNALS IN A TELEPHONE CONFERENCE CIRCUIT

BACKGROUND OF THE INVENTION

The present invention relates to a method for establishing a telephone conference in a telephone system, and more particularly, to a method of combining voice signals so that a telephone conference may include hundreds of members and so that a member may participate in more than one conference.

Typically, telephone systems include some form of digital timeshare circuitry to communicate voice signals among users. In such systems, the voice signals are digitized and are routed by a central processor to the intended recipient. (The term "voice signal(s)" also refers to other analog signals that may be digitized and communicated, such as analog data signals.) Where more than one such digital signal is to be routed to a single recipient, as in a conference, the digital signals are typically added. The digital signals may be received and added in a first timeframe and the sum transmitted during a second timeframe. The present invention relates to the method of summing the digital signals.

While various methods of combining digital signals for a telephone conference are known, none provide the versatility that allow use of the method with a small conference of only a few members and with a conference of hundreds of members without changing telephone system hardware. Further, none of the known methods can also allow a member of one conference to simultaneously monitor other conferences.

It is known, for example, to combine digital signals in a telephone conferencing circuit by using a pyramid of additions. In such methods the sum of two signals is added to another signal, with the sum being added to a further signal, and so on until all signals are added. For a system with hundreds of signals the result may require hundreds of levels of additions and a complex mapping scheme to provide the signals to the right spots in the pyramid. Such a pyramid arrangement may degrade the signal and may provide problems with time sequencing of signals in the telephone system. See, for example, the system in U.S. Pat. No. 4,975,902 to Damany.

Other methods for combining signals in a telephone conference may require additional access lines or other hardware to accommodate conferences with hundreds of members. See, for example, U.S. Pat. No. 4,481,624 to Baranyai, et al., U.S. Pat. No. 3,997,730 to Stidham and U.S. Pat. No. 3,971,895 to Hollis, et al.

The method of the present invention uses a multiplicity of identical adders and a repeatable hierarchical scheme to provide the flexibility needed for both large and multiple conference capabilities. In a preferred embodiment of the present invention, groups of up to six conference members are formed and digital signals from each of the six members are provided to a first adder where all six signals are combined. Through six additional adders, each member of the group receives signals from every other member of the group. When more than one group of six is present, the combined signals from all of the first adders from the groups are combined in a second adder. Through additional adders, each group receives the combined signal from every other group. This hierarchical scheme may be repeated until all groups of six members are combined and every group receives signals from every other group.

Accordingly, it is an object of the present invention to provide a novel method of combining digital signals for a telephone conference that is versatile enough to operate with large and small conferences and which obviates the problems of the prior art.

It is a further object of the present invention to provide a novel method for telephone conferencing that uses a plurality of identical adders arrayed in a repeatable hierarchical scheme.

It is yet a further object of the present invention to provide a novel method of combining signals for a telephone conference in which the same hardware may be used to provide conferences with sizes ranging up to hundreds of members and to provide the capability to combine conferences.

It is another object of the present invention to provide a novel method of combining signals for a telephone conference in which a member of one conference may monitor a second conference without rearranging or otherwise affecting the first conference.

These and many other objects and advantages will be readily apparent to one skilled in the art to which the invention pertains from a perusal of the claims, the appended drawings, and the following detailed description of preferred embodiments.

DETAILED DESCRIPTION OF THE DRAWINGS

FIG. 1 is a functional diagram of an adder of the type that may be used in the present invention.

FIG. 2 is a functional diagram of the mapping sequence of adders in a six member conference of the present invention.

FIG. 3 is a functional diagram of the mapping sequence of adders in a sixteen member conference of the present invention.

FIG. 4 is a diagram of the signal flow in the present invention from the perspective of a single conference member.

FIGS. 5 and 6 are functional diagrams of the mapping sequence in a multi-conference of the present invention.

DESCRIPTION OF PREFERRED EMBODIMENTS

Figure 6:
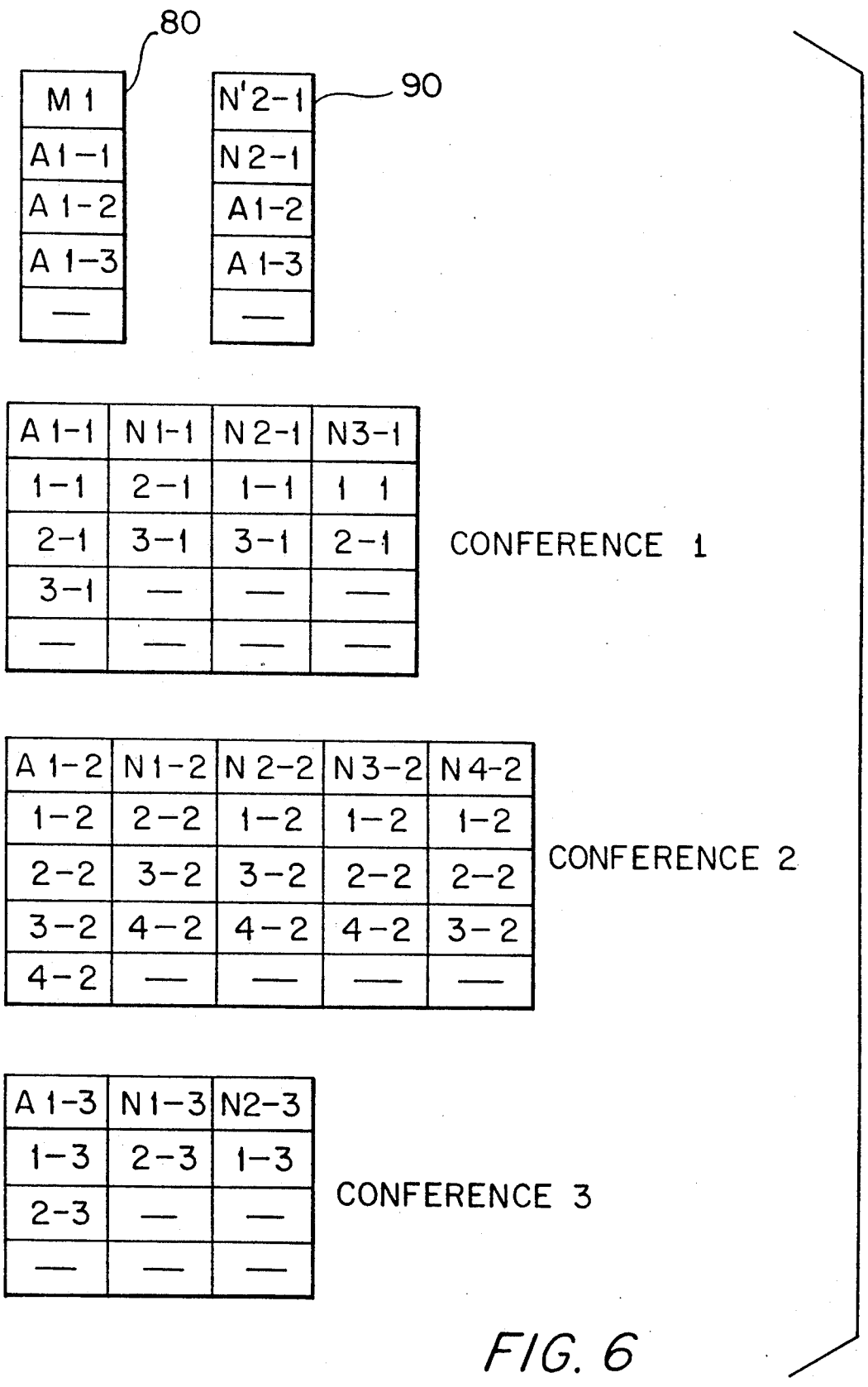

A preferred embodiment of the method of the present invention may be seen with reference to FIGS. 1–3. As seen in FIG. 1, the present invention may include a multiplicity of adders 10, each capable of combining plural inputs and providing a single output that is a combination of the inputs. In the figures the inputs to each adder are listed in the column below the output signal designation. Each number refers to the voice signal of the numbered conference member, with the "N" meaning "not". For example, designation "N1" refers to an output that includes voice signals from all conference members, except from member number 1. As will be seen, the signal N1 is typically routed to member number 1 because each conference member receives all voice signals except its own. The figures "2", "3", "4", and the like refer to the inputs from conference members 2, 3, 4, etc.; and "A1", "B1", etc. refer to outputs from adders combining all the signals listed below that designation.

With reference again to FIG. 1, adder 10 receives input from conference members 2, 3, and 4 and combines them into an output signal that is provided to conference member 1. Unused input slots in an adder may be silent.

Adder 10 may be any device appropriate to the telephone art that is able to combine plural digital signals into a single output. In the preferred embodiment each adder 10 is able to combine digital signals from six inputs. Over the wide range of conference sizes with which the present invention may be used and in view of the current availability of such adders, six inputs per adder produces a simple use of resources. Of course, where the range of conference sizes is very small or very large, adders which combine another number of inputs may be more efficient. It is to be understood that the present invention is not limited to adders with six inputs. The adders 10 may optionally perform attenuation or Automatic Gain Control.

With reference now to FIG. 2, the operation of the present invention with a conference having six members may be seen. Each conference member (designated by its corresponding output N1-N6) receives an output from an adder 10. Each adder 10 sums the inputs from all other members of the six member conference. In other words, the adder 10 for conference member 1 combines the signals from conference members 2-6. An additional adder 20 (which may be identical in structure to adder 10), sums the signals from all conference members. The output A1 from adder 20 is not used in a conference with six members, but will be used later as an input to members 7, 8, 9 . . . n and may be used to contribute to the combined signal from all conference members when conference monitoring is implemented.

The method of forming a conference with more than six members may be seen with reference to FIG. 3, which illustrates formation of a conference with sixteen members. Conference members are formed into groups of six and allocated adders in the manner illustrated in FIG. 2. As illustrated by groups A1, A2 and A3 in FIG. 3, each group of up to six members is identical, with the possible exception of the number of members per group.

When more than one group of six is formed, a new group B1 produces outputs NA1, NA2, NA3 (NA1 meaning not including group A1). These signals are used by groups A1, A2 and A3 to provide signals to the group's members from conference members outside the group. Group B1 also produces output B1 which is the sum of all sixteen conference members. As with output A1 in FIG. 2, B1 is not used with this number of conference members. As the number of groups of six conference members increases beyond six (36 members) output B1 becomes available to provide signals from all conference members in these six groups to other groups. This hierarchical scheme may be repeated regularly until all conference members are connected.

The hierarchical arrangement of the present invention may be more clearly seen with reference to FIG. 4 that illustrates signal flow from the perspective of a single member 30. Adders are indicated in FIG. 4 as adder A through adder F. (The further designation as adders 10 and 20 has been included to facilitate correlation with FIGS. 1-3). Member 30 provides a digital signal through connection 40 to adder A where the signal is combined with signals from up to five other members. The signals from the up to five other members are also provided to adder B where they are combined and sent to the member 30 through connection 50. Connections 40 and 50 may be any known telephone system connection device suitable for this purpose.

When there are six or fewer members of the conference, the signals from adders A go no further and adder B receives no other signals. This represents a first hierarchical level (Level I). In the event more than six members are in the conference, additional Level I groups, each with adders A and B, are present (not shown in FIG. 4). Each group of six members thus has seven adders; one adder B per member and one adder A for combining all signals. Up to six adders A from Level I groups are connected to adder C at hierarchical Level II. The Level I adders A that do not include the signal from member 30 are also connected to adder D that provides a combined signal to adder B where the combined signal is routed to member 30. Member 30 thereby receives signals from all other Level I groups. Signals from adder C go no further and adder D receives no signals when there are 36 or fewer members. As may be apparent from further consideration of the hierarchical scheme of FIGS. 3 and 4, a conference with 36 members requires as few as 49 adders (six groups of seven Level I adders and one group of seven Level II adders).

When more than 36 members are in a conference further hierarchical levels may be added. For example, with further reference to FIG. 4, the next level employs the same scheme as Levels I and II in that the outputs of all adders C from Level II are combined in adder E. The outputs from the Level II adders C are also connected to adder F with the combined signal being provided to the member through adder D and adder B. Three hierarchical levels will provide conference capability for up to 216 members with as few as 301 adders (36 groups of seven Level I adders and six groups of seven Level II adders and one group of seven Level III adders).

The time delays encountered in the present invention are related to the number of hierarchical levels. Each level delays the signal by the duration of one sound sample. In a typical telephone system a sound sample is 125 microseconds. The hierarchy of the preferred embodiment increases the worst case delay proportional to the logarithm (having a base equal to the number of adder inputs) of the number of members in the conference. For example, for adders with six inputs the delay increases by a factor of one for conferences with up to six members ($\log_6 6 = 1$), by a factor of two for conferences with up to 36 members ($\log_6 36 = 2$) and by a factor of three for conferences with up to 216 members ($\log_6 216 = 3$).

With reference now to FIG. 5, in an alternative embodiment an adder 60 may combine fewer signals to achieve the same result as adder 20 shown in FIG. 2. For example, adder 60 may combine the signal from member 1 and the signal N1 (not member 1) to combine the signals from members 1-6, albeit with longer time delay than for adder 20.

With further reference to FIGS. 3 and 5 it is apparent that other conferences may be monitored without disrupting the arrangement of the already established conference. Signals from all conference members are available from the output of a single adder, such as the output B1 from Group B1 in FIG. 3. This signal may be routed to other conferences as desired so that the conference may be monitored. As seen in the signal for member 6 in FIG. 5, an adder 70 may provide a signal N'6 to member 6 that includes the signals N6 and B1.

Alternatively, and as seen for member 5 in FIG. 5, when an adder providing a signal to a conference member does not use all of the available input ports, the combined signal (e.g. B1) from a conference to be monitored may be provided to one of the unused ports.

The monitoring features of the present invention may be more clearly seen with reference to FIG. 6. As illustrated therein a listener M1 not previously a member of any conference may monitor one or more of conferences (signals in the conferences 1, 2 and 3 in the figure are distinguished as "−1", "−2" and "−3") by combining the signals A1-1, A1-2 and/or A1-3 in adder 80. The listener may receive these signals without attenuation.

A member of one conference may actively participate (talk and listen) in one conference while monitoring (listen only) other conferences. The signals of the monitored conferences may be attenuated so that the listener may distinguish the active conference from the monitored conferences. For example, member 2-1 of conference 1 in FIG. 6 may actively participate in conference 1 and monitor conferences 2 and 3 by combining the signals shown in adder 90. The signal N2-1 may be received at normal strength and signals A1-2 and A1-3 may be attenuated. In four wire telephone devices the monitored conference signals are not fed into the active conference (and vice versa) because the input and output signals are fully isolated from each other.

When a conference member elects to become an active member of two conferences, the two conferences are combined into one active conference with all members from both of the combined conferences.

One of the advantages of the conferencing scheme described above is that the scheme is "regular", i.e., substantially the same logic (and therefor electronic switching) can be used for all levels of the hierarchy. The scheme uses substantially the same switching logic regardless of the number of participants in the conference, the logic forming additional hierarchical levels as needed to accommodate all of the participants.

While preferred embodiments of the present invention have been described, it is to be understood that the embodiments described are illustrative only and that the scope of the invention is to be defined solely by the appended claims when accorded a full range of equivalence, many variations and modifications naturally occurring to those skilled in the art from a perusal hereof.

We claim:

1. A method of establishing a telephone conference among plural conference members, the method comprising the steps of:
   a. providing a plurality of identical adders, each having six input ports and one output port, each for combining up to six signals received at said input ports and providing the combined signal at said output port;
   b. connecting up to six conference members to the input ports of an adder A of a group of up to seven adders and to the input ports of the remaining adders B in said group so that each adder B is able to receive all but one of the up to six signals;
   c. connecting each of the connected conference members to the output port of one of the adders B so that each conference member does not receive its own signal;
   d. repeating steps b. and c. and forming additional ones of said group until all conference members are connected;
   and in the event there are more than six conference members,
   e. connecting the output port from each said adder A in each said group to the input ports of an adder C of a further group of adders of up to seven adders and to the input ports of the remaining adders D in said further group so that each adder D is able to receive all but one of the signals from said adders A;
   f. connecting the output port of each of the remaining adders D in said further group of adders to the input ports of each of said adders B so that each of the adders B receives signals from all conference members outside their said group; and
   g. repeating steps e. and f. until each said group is connected.

2. A method of establishing a telephone conference among plural members comprising the steps of:
   a. forming at least one group of up to a predetermined number of members;
   b. providing an adder A for each said group for combining signals from the members of each said group;
   c. providing an adder B for each member of each said group for combining the signals from each other member of the said group so that each member does not receive its own signal;
   and in the event there is more than one said group,
   d. connecting said adder A from a predetermined number of said groups to an adder C for combining the signals from said adders A;
   e. providing an adder D for each said adder B for combining the signals from said adders A so that each said adder B does not receive its own signal.

3. The method as defined in claim 2 wherein said predetermined number of members and said predetermined number of said groups is six.

4. The method of claim 2 further comprising the step of providing the combined signals from a further telephone conference to said adders B so that each of the plural members may monitor the further telephone conference.

5. The method of claim 2 further comprising the step of providing the combined signals from adder A to a further telephone conference for monitoring by members thereof.

6. A method of joining telephone conferences each being established as defined in claim 2, comprising the steps of:
   providing the combined signals from said adder A from a first telephone conference to said adders B of a second telephone conference; and
   providing the combined signals from said adder A from the second telephone conference to said adders B of the first telephone conference.

7. A method of establishing a telephone conference among plural members using a repeated hierarchical level method of connecting input signals wherein the repeated hierarchical level method comprises the steps of:
   a. arranging the input signals at a hierarchical level into groups of a predetermined number;
   b. providing a first adder to each of said groups, each said first adder for combining a predetermined number of said input signals into one first output signal;
   c. providing plural second adders, one for each of the input signals, for combining a predetermined number of said input signals into one second output signal so that all but one of said input signals is combined in each of said second output signals; and d. providing plural said first output signals as input signals at a further hierarchical level wherein steps a.–c. above are repeated.

8. A circuit for telephone conferencing among plural members comprising:

an adder A for each group of up to a predetermined number of members for combining signals from the members of each said group;

an adder B for each member of each said group for combining the signals from each other member of the said group so that each member does not receive its own signal;

and in the event there is more than one said group, an adder C for combining the signals from a predetermined number of said adders A;

an adder D for each said adder B for combining the signals from said adders A so that each said adder B does not receive its own signal.

9. The circuit as defined in claim 8 wherein said predetermined number of members and said predetermined number of said groups is six.

* * * * *